United States Patent [19]

Sprague et al.

[11] Patent Number: 4,768,959

[45] Date of Patent: Sep. 6, 1988

[54] METHOD OF TEACHING AND TRANSCRIBING OF LANGUAGE THROUGH THE USE OF A PERIODIC CODE OF LANGUAGE ELEMENTS

[76] Inventors: Robert Sprague; Joan Sprague, both of 488 LaPrenda Rd., Los Altos, Calif. 94022

[21] Appl. No.: 923,422

[22] Filed: Oct. 27, 1986

Related U.S. Application Data

[62] Division of Ser. No. 664,227, Oct. 24, 1984, Pat. No. 4,650,423.

[51] Int. Cl.4 .............................................. G09B 19/00

[52] U.S. Cl. .................................... 434/156; 434/167; 434/185; 283/1 A; 283/46

[58] Field of Search ............... 434/156, 178, 159, 167, 434/185, 430; 283/1 A, 45, 46; 400/486

[56] References Cited

U.S. PATENT DOCUMENTS

| | | | |
|---|---|---|---|
| 660,255 | 10/1900 | Kingma | 434/185 |
| 1,087,336 | 2/1914 | Thurber | 434/430 |
| 1,590,998 | 6/1926 | Balston | 400/99 |
| 3,367,045 | 2/1968 | Mendez | 434/185 |
| 4,180,337 | 12/1979 | Otey, III et al. | 400/486 |
| 4,193,212 | 3/1980 | Al-Kufaishi | 434/178 |
| 4,650,423 | 3/1987 | Sprague et al. | 434/156 |

FOREIGN PATENT DOCUMENTS

| | | |
|---|---|---|
| 651504 | 9/1985 | Switzerland . |
| 1138821 | 1/1969 | United Kingdom . |
| 1585218 | 2/1981 | United Kingdom . |

OTHER PUBLICATIONS

Initial Teaching Alphabet, Washington Post, Nov. 30, 1969, p. B-3.

*Primary Examiner*—William H. Grieb
*Attorney, Agent, or Firm*—Limbach, Limbach & Sutton

[57] ABSTRACT

Apparatus and method used in language skills development are described. A periodic table of forty-five language elements is presented. The periodicity of the elements is described in terms of articulation mechanisms. Photographs of mouth pattern and voice frequency information are provided for each language element. The two major families of vowels and consonants are preserved and emphasized on phonomats. These phonomats are designed to reinforce the relationship among the language elements. Alternate spellings, specially encoded, are provided to enable the student to pronounce new words and sentences based on his prior familiarity with the symbol and sound bets presented on the periodic table of language elements.

7 Claims, No Drawings

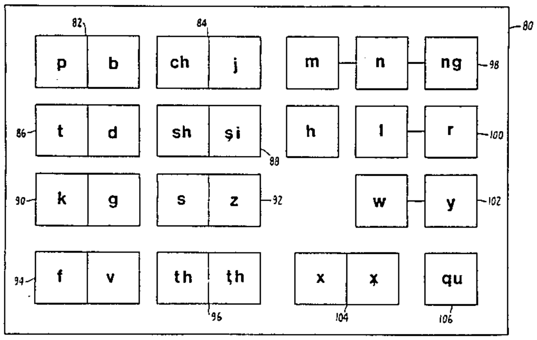

CONSONANT PHONOMAT

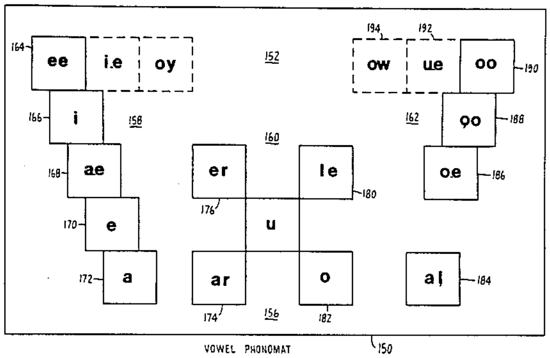

VOWEL PHONOMAT

|  | COL 1 COL 2 | COL 3 COL 4 | COL 5 |
|---|---|---|---|
| R1<br>R2<br>R3 | FIG. 1 | FIG. 2 | FIG. 3 |
| R4<br>R5<br>R6 | FIG. 4 | FIG. 5 | FIG. 6 |
| R7<br>R8<br>R9 | FIG. 7 | FIG. 8 | FIG. 9 |

THE PERIODIC TABLE OF LANGUAGE ELEMENTS

CONSONANT PHONOMAT

VOWEL PHONOMAT

METHOD OF TEACHING AND TRANSCRIBING OF LANGUAGE THROUGH THE USE OF A PERIODIC CODE OF LANGUAGE ELEMENTS

This is a division of application Ser. No. 06/664,227, filed 10-24-84, now U.S. Pat. No. 4,650,423, granted 3-17-87.

DESCRIPTION

1. Technical Field of the Invention

This invention relates to apparatus and methods of teaching and transcription of language based on a periodic code of language elements. It is specifically directed for use in developmental language education. The periodic code of language elements makes possible numerically coded spelling. The methods of teaching concentrate on reinforcement activities showing the relationship between the sound and symbol characteristics of each language element.

2. Background Art

Probably the greatest human asset is the ability to communicate through language. Therefore, it is not unexpected that much effort in both time and money goes into acquiring language skills and language transcription devices. Unfortunately, only the capacity for language is inherited and new acquisition of language is required after each new birth; and for many of us it is likened unto years of labor pains. There have been several famous, compassionate individuals of wisdom who have recognized the enormous price paid in acquisition of language skills, and who have cried out to educators and politicans for help; but the problem has so far defied solution.

George Bernard Shaw was so provoked about the plausible spellings for "fish" that he established an award in his Will for the best suggestion for a new alphabet. Although the Will was in legal trouble, his desire resulted in the Shaw-Malone Unifon Augmented Alphabet in 1962.

Another author, Upton Sinclair wrote a letter to President John F. Kennedy asking him to commission scholars, to give them the staff and necessary funds so that there could be proposed an optimum spelling reform. Mr. Sinclair told President Kennedy that there was little chance that the President could do anything else that would give such benefit to the human race.

Over many centuries reformers have proposed pronouncing phonetic alphabets, augmented alphabets, diacritical alphabets, digraphic alphabets and non-romanic alphabets. Unfortunately, many of the alternative alphabets have required the use of many symbols not available on ordinary typewriters. Such alphabets also incorporated elements of foreign alphabets making the printing of materials in these alternate forms difficult. It also hindered the transition from the enhanced alphabet to normal reading and writing. Further, alternative alphabets did little to systematize language concepts. Rather than relate the various sounds, symbols and spellings found in everyday speech and writing, a new symbol was developed for each aberration. These shortcomings made the use of alternate alphabets less appealing and, as a result, largely unpopular. All of these efforts have not solved the language learning problems, nor have they passified the neomorph, and the cry continued.

At this point the state of the language art is similar to the state of chemistry in the time of the alchemists. Until this effort, not one has even suggested the potential for a periodic code of language elements, let alone, construct one. The effort of the instant invention has extended over many years and has reached this present form after many discouraging attempts and failures. To keep from being too discouraged in the project, one day about four years ago, I wrote a poem to emphasize that the great need in language and language education was a periodic code of language elements.

LANGUAGE ELEMENTS

Phonemes are the elements of a language As bricks are the elements of a building But in the science of developmental language There must be not only elements, but order For an arbitrary list of phonemes Contributes no more to language Than a random pile of bricks Contributes to a building.

R. S. Sprague

July 10, 1980

The periodic code has not only given the language elements cohesiveness and completeness through the periodic orderly separation of vowels and consonants, but it has given a more definite basis for dividing vowels into what most people call long and short quality vowels. In addition, there are rather striking similarities among consonant groupings likened unto the groupings of chemical elements with similar properties in the chemical periodic table.

It is therefore an object of the present invention to make the teaching of elementary language structure less difficult;

It is a further object of the present invention to shorten the language learning time span through use of a laboratory setting;

It is still a further object of the present invention to make a system which is suitable for a wide age spectrum;

It is another object of the present invention to reduce the financial burden of language development education by using durable and inexpensive materials;

It is yet another objective of the present invention to make a system not necessarily limited to small group instruction.

SUMMARY OF THE INVENTION

Broadly stated, the present invention, to be described in greater detail below, is directed to a method of teaching and transcription of language by using a matrix of forty-five language elements whose periodicity is functionally dependent and whose elements are successively numbered. Each language element has a symbol bet, a sound bet, a picture bet and various alternate spelling bets. It is the systematic presentation of sound bets, picture bets and symbol bets which forms the basis for this method of language development education. There are provided phonomats for vowels and consonants which reinforce the relationship between the sound bets, picture bets and symbol bets.

Language skills development according to the instant invention is strongly dependent on the articulation mechanisms involved in producing the sound bet for each language element. The student is made aware of the mouth patterns and tongue positions associated with each sound bet. This awareness of the articulation mechanisms is reinforced by the use of picture bets on the periodic table of language elements. The picture bet captures the mouth pattern and, where not obstructed by the teeth, the tongue position associated with each language element. The importance of these mechanisms and the interrelationship between groups of language elements is further emphasized by the phonomat programs briefly described above.

Another aspect of language skills development is also taught using the periodic table of language elements. Each element of the table contains alternate spelling bets if there are any. These alternate spelling bets are coded with common punctuation marks so that when appearing in a word or sentence the student can consult the periodic table to see how that alternate spelling should be pronounced. As the student's skills are developed, the code marks can be deleted.

DETAILED DESCRIPTION OF THE INVENTION

A. The Periodic Table of Language Elements

Referring to FIGS. 1 through 10, it can be seen that the periodic table of language elements represents a matrix of nine rows and five columns. There are forty-five language elements in this table; each language element is represented by a symbol 20. These forty-five language elements are constructed from the standard twenty-six letter alphabet familiar to all. In this periodic table, the vowels are presented in columns 1 and 2 and the consonants are presented in columns 3, 4 and 5, see FIG. 10. It will be noted that the conventional alphabetic order has been retained if the table is read from the upper left hand corner (row one, column one) across the rows left to right to "Z" in the lower right hand corner (row nine, column five). The increase from twenty-six letters of the alphabet to the forty-five language elements of the periodic table is a result of the use of digraphs. Digraphs are two alphabet letters combined to spell the symbol <u>bet</u> (a bet is a character of the language element, e.g. symbol bet=j, spelling bet=ge, etc.). These digraphs were incorporated to fit more closely the language elements to common experience in speech and reading.

Figure 4:
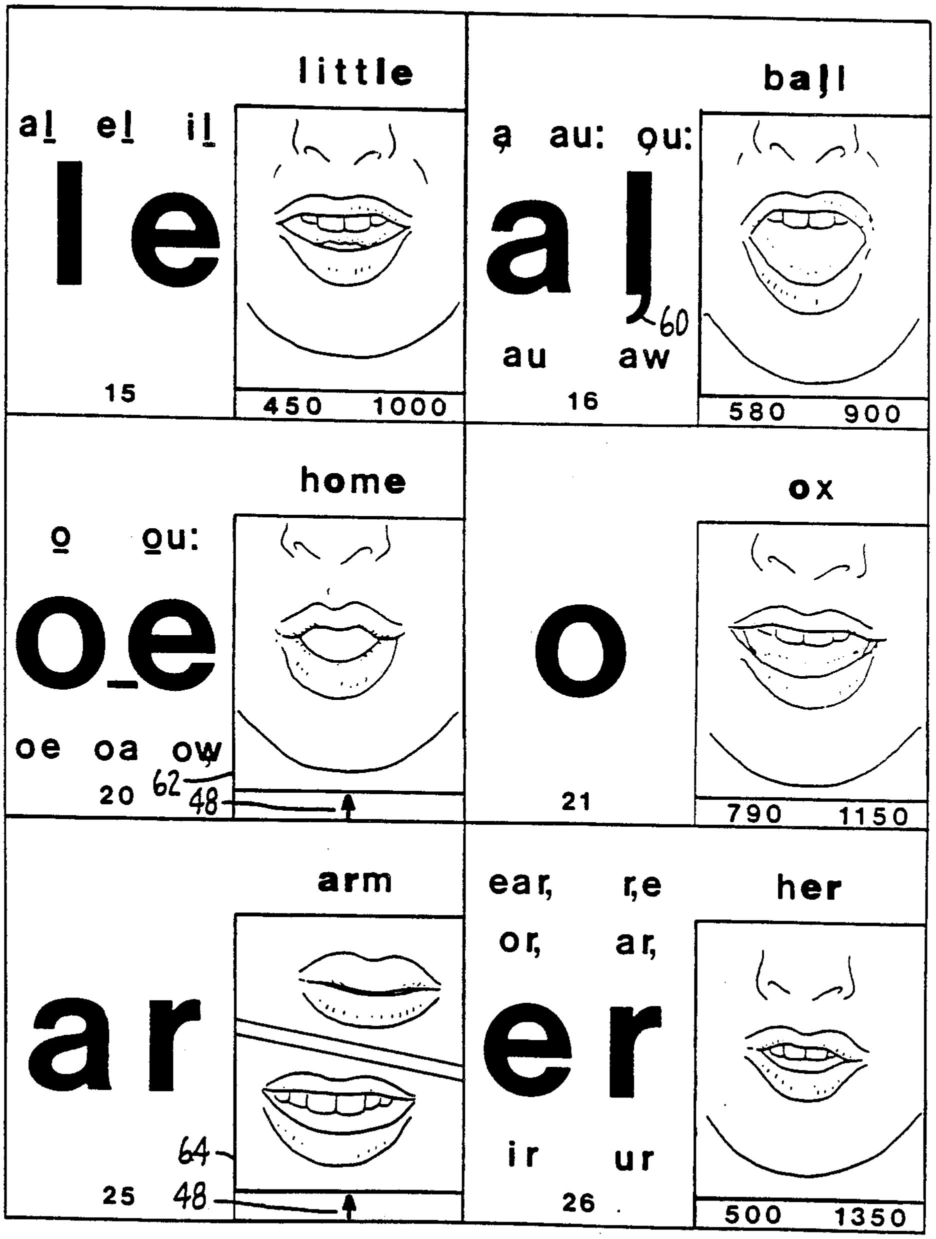
FIG. 4 shows the detail of the middle left section of the periodic table of language elements.

The information contained in each language element of the periodic table can be described with reference to FIG. 1, particularly the language element "i_e". Each language element is represented by a symbol bet, in this case "i_e" 22. This digraph contains the code element "_" 24, called a split, which represents an interposed consonant. Immediately to the right of the symbol bet is a photograph of the shape of the lips when the language element is pronounced. In this example, "i_e" is cross-slider represented by two photographs 26 and 28 and the symbol "$" 30 below the photograph 28. A vowel, such as "i_e", is a cross-slider because when spoken, the tongue begins in either a high, mid or low position but always ends in a high tongue position. Two tongue positions and two lip patterns will be necessary to complete the sound. A further discussion of straight sliders cross-sliders, etc., is deferred until the vowel and consonant phonomats are described below. In short, the notation below the photograph 28 is related to the sound bet for that language element. In FIG. 4, the other code symbol the tag, ",", is shown 60. The tag alerts the reader that the sound bet is different from what would be expected.

Figure 1:
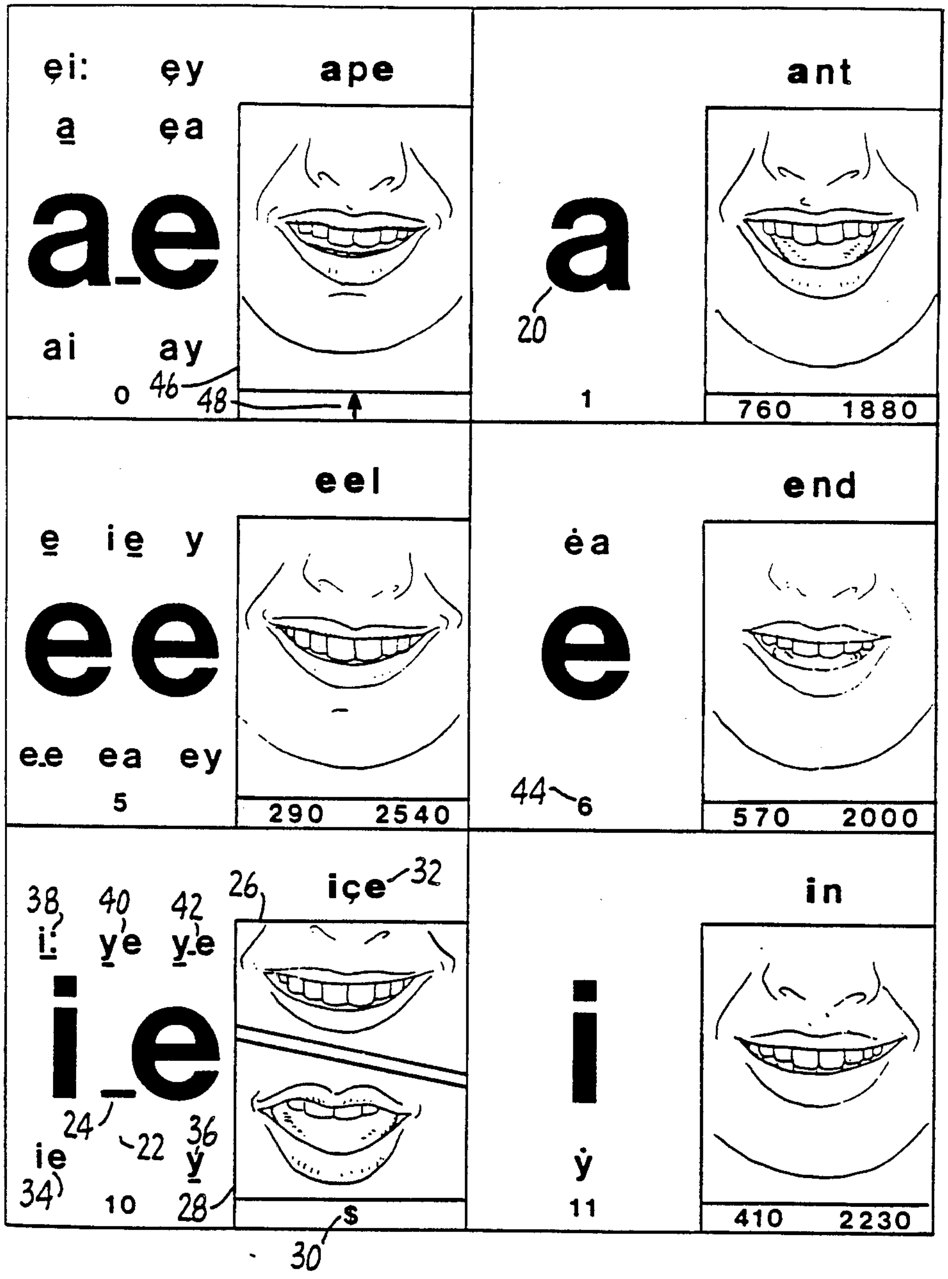
FIG. 1 shows the detail of the upper left hand corner of the periodic table of language elements.
Figure 2:
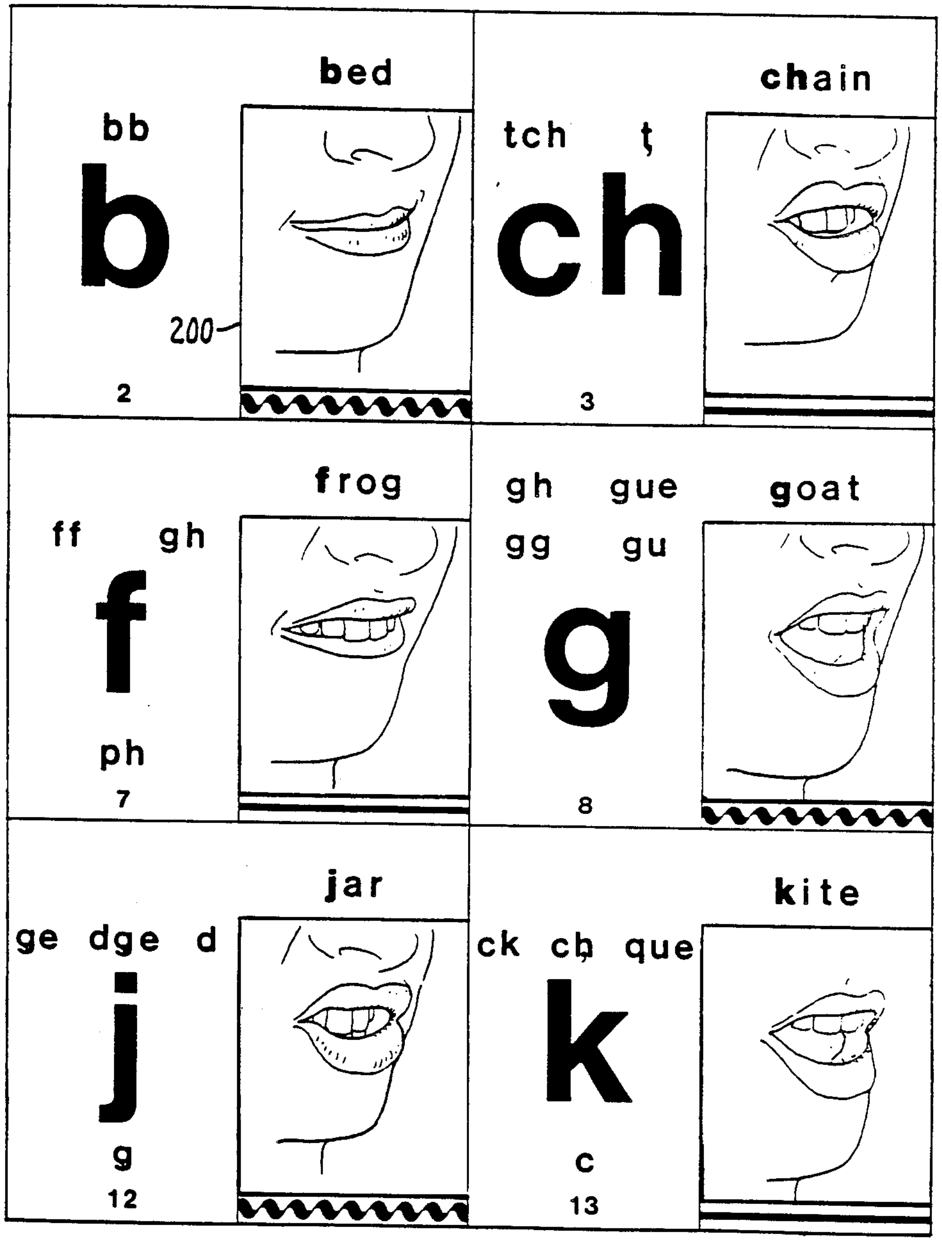
FIG. 2 shows the detail of the upper middle section of the periodic table of language elements.
Figure 3:
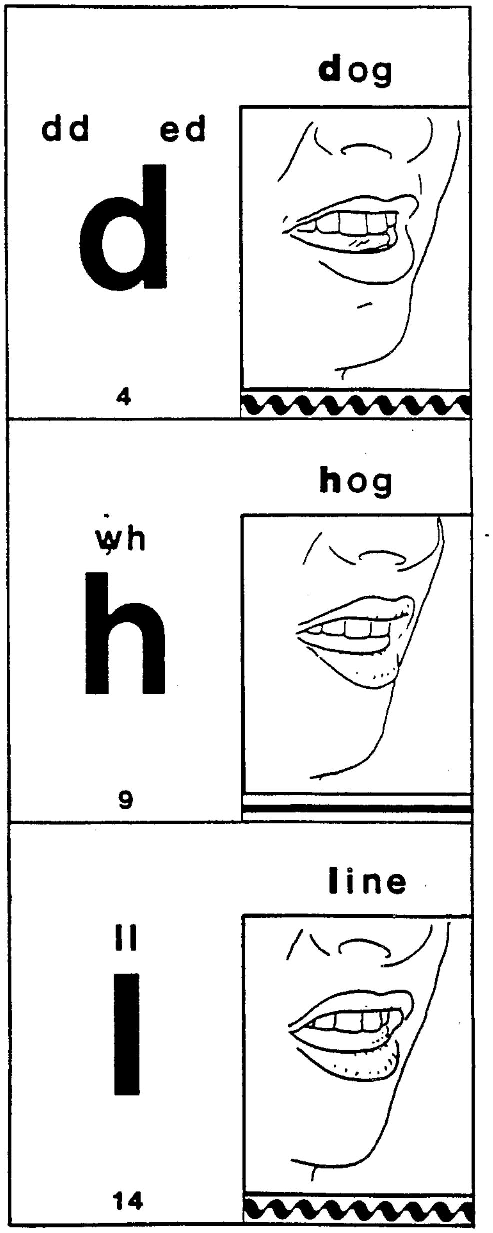
FIG. 3 shows the detail of the upper right corner of the periodic table of language elements.

Just above the photograph 26, in FIG. 1 there is a keyword; for "i_e", it is "ice" 32. This keyword is presented to reinforce the relationship between the symbol bet and sound bet. Pronunciation of the keyword 32 will cause the lips to be shaped as in the photographs 26 and 28. The correspondence between the sound bet and the symbol bet 22 is an important aspect of the teaching methods described below. Surrounding the symbol bet "i_e" (sometimes referred to as a BASIC bet) are alternate spelling symbol bets. The GO bets are below the BASIC symbol bet 22 and are "ie" 34 and "y" 36 in this example. The CAUTION bets are above the BASIC symbol bet 22 and are "i:" 38, "ye" 40 and "y_e" 42. The addition of the code symbols ".", "_", "..", ":", "*", "/", "( )", "[ ]" to and "{ }" the alternate spellings can be used in reading texts to permit the reader to pronounce the words based on his familiarity with the periodic table of language elements. A perfect example is the sentence:

Tough boughs could break, though not through thought alone.

Properly coded:

T*ough boughs cọod could break, th<u>o</u>ugh not through thọught alone.

Another aspect of the alternate spelling bets is the possibility of numerical spelling with applications in machine assisted contexts. As seen in FIG. 1, each BASIC bet or language element is given a number 44 between 0 and 44 to represent its position within the periodic table. Thus, the BASIC bet can be represented by the number XY. GO bets are numbered from 1 to 3 and CAUTION bets are numbered from 4 to 9. Therefore, the set of numbers XYZ can represent the speech, symbol and spelling bets.

This numerical representation also exposes the special periodicity of the language elements. All "long" quality vowels have a Y digit of either 0 or 5 while all "short" quality vowels have a Y digit of either 1 or 6. All other Y digits are consonants. It is quite remarkable that the vowels are completely segregated from the consonants and that there are segregated groupings among the consonants as well as among the vowels. A further discussion of these groupings can be found below in the description of the phonomats for vowels and consonants which follows.

B. Phonomats

As noted above, a fundamental feature of language skills instruction according to this invention is the continued reinforcement of the relationship between the sound bets and symbol bets for each language element. The subtleties and nuances of the periodic table of language elements become more apparent when this reinforcement is accomplished through the use of phonomats which compare and contrast the different sound bets in an orderly and rigorous method. Two phonomats are needed to represent two major families of speech sounds: the consonants and the vowels.

Figure 5:
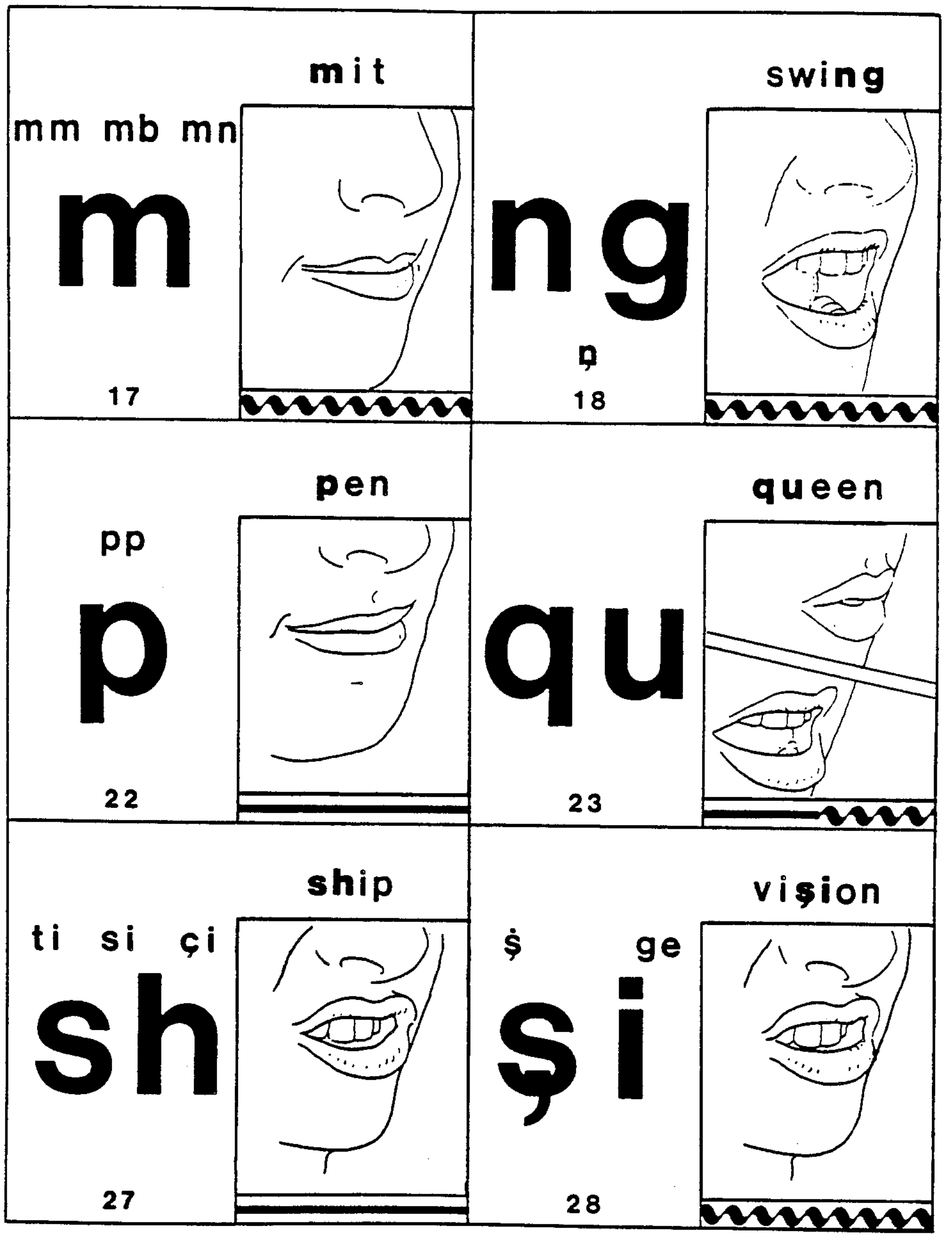
FIG. 5 shows the detail of the middle section of the periodic table of language elements.
Figure 6:
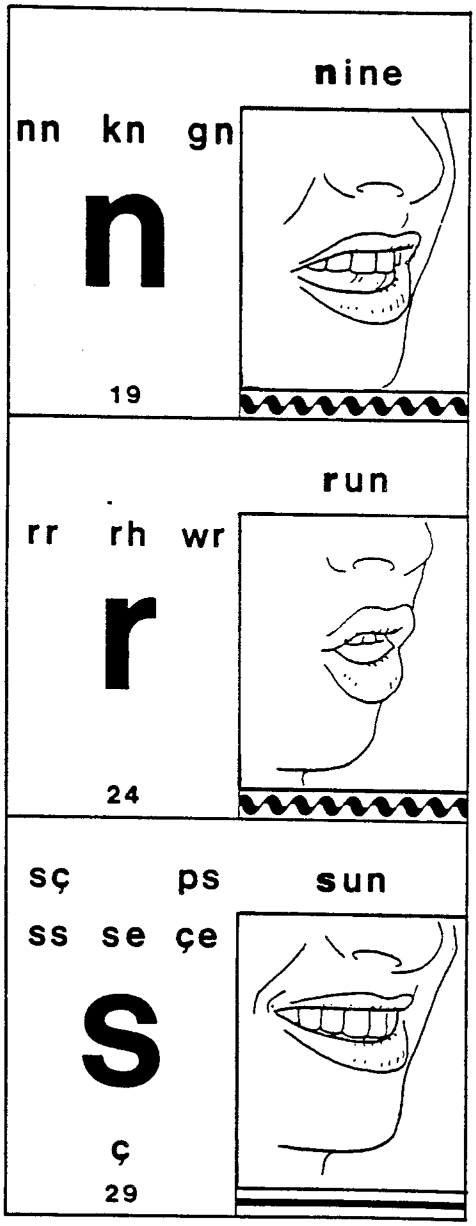
FIG. 6 shows the detail of the middle right section of the periodic table of language elements.
Figure 7:
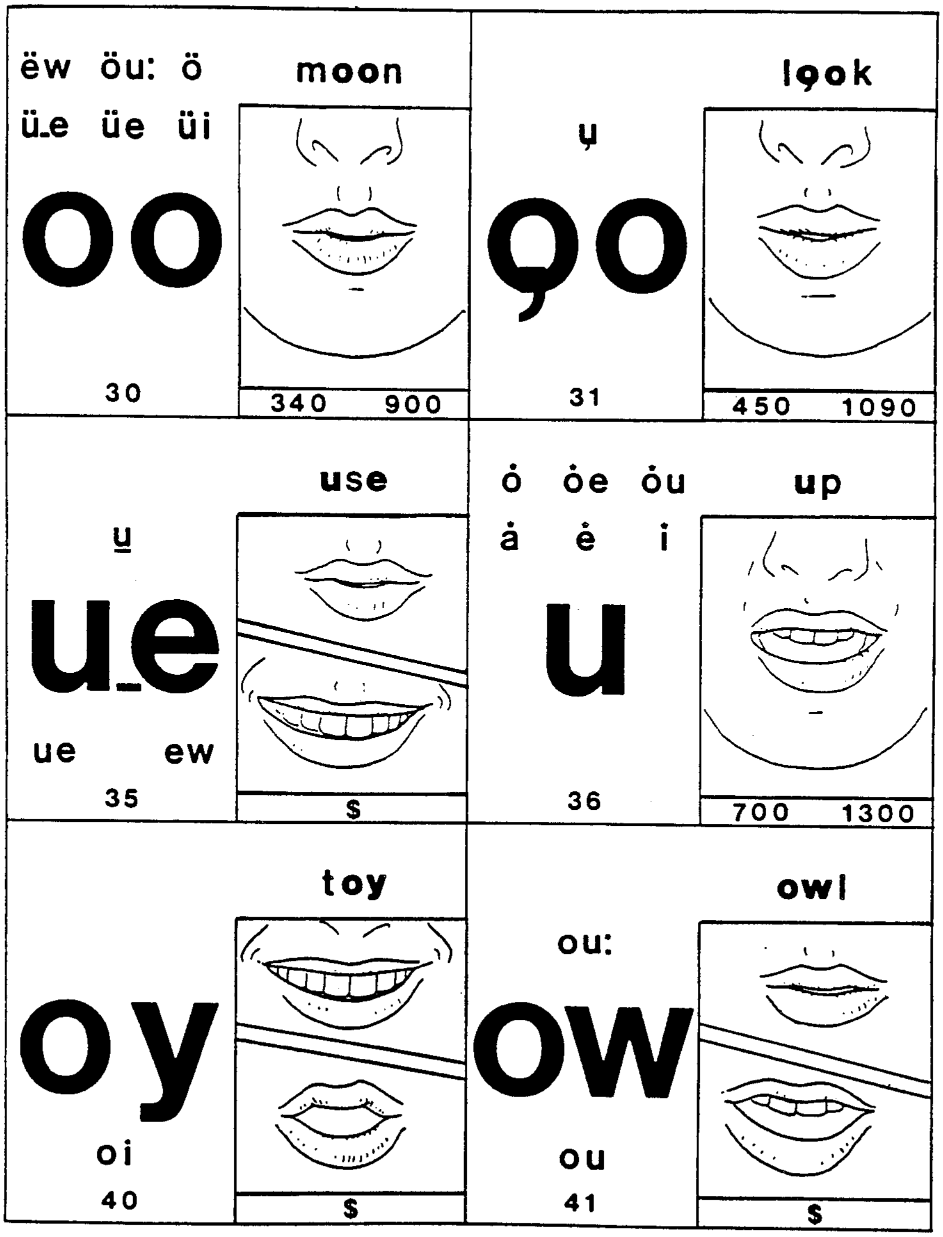
FIG. 7 shows the detail of the lower left corner of the periodic table of language elements.
Figure 8:
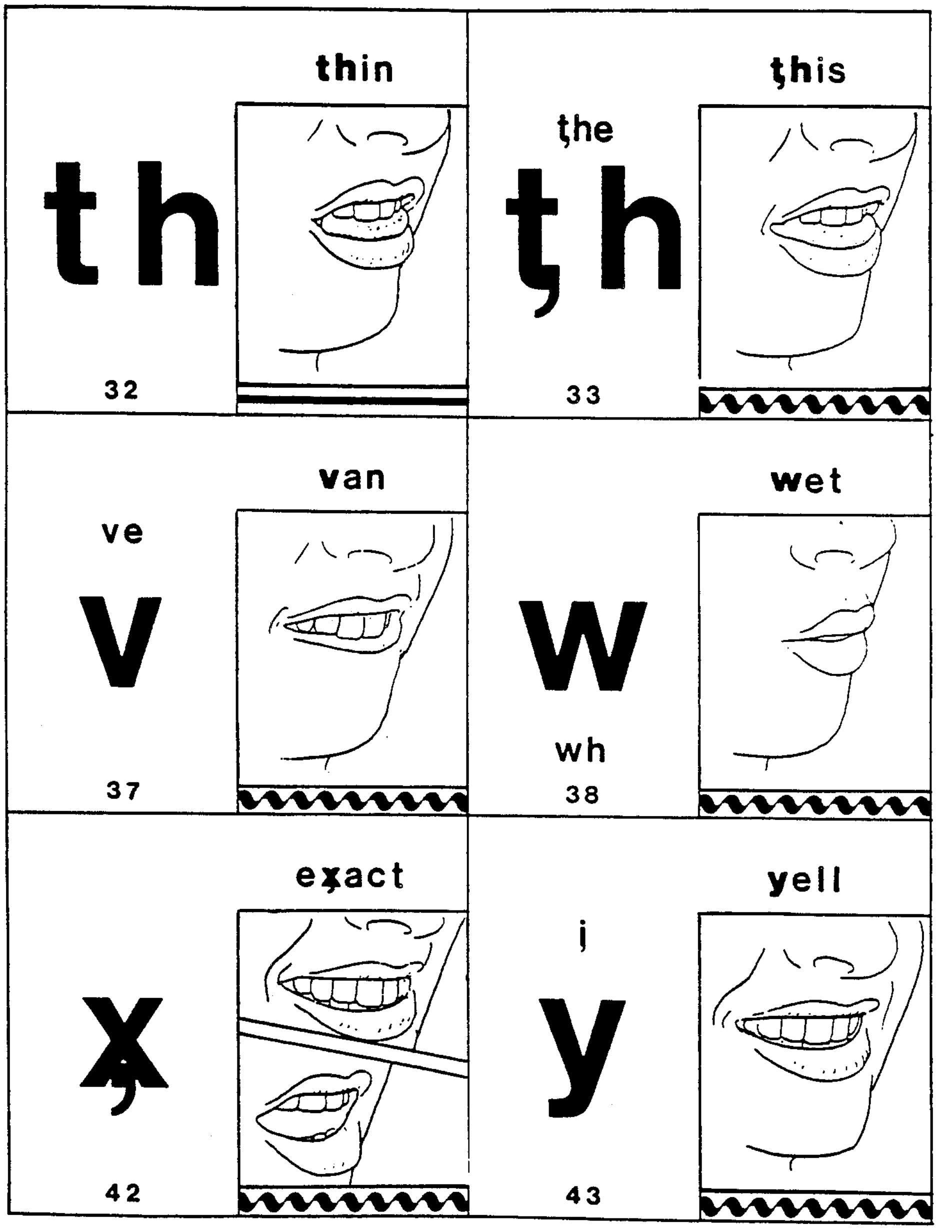
FIG. 8 shows the detail of the lower middle section of the periodic table of language elements.
Figure 9:
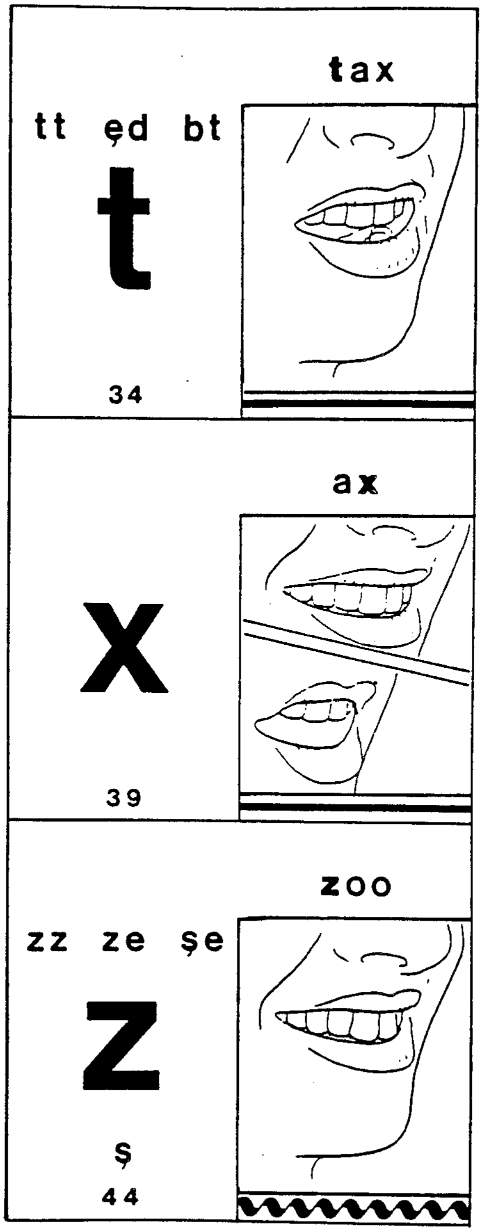
FIG. 9 shows the detail of the lower right corner of the periodic table of language elements.
Figure 10:
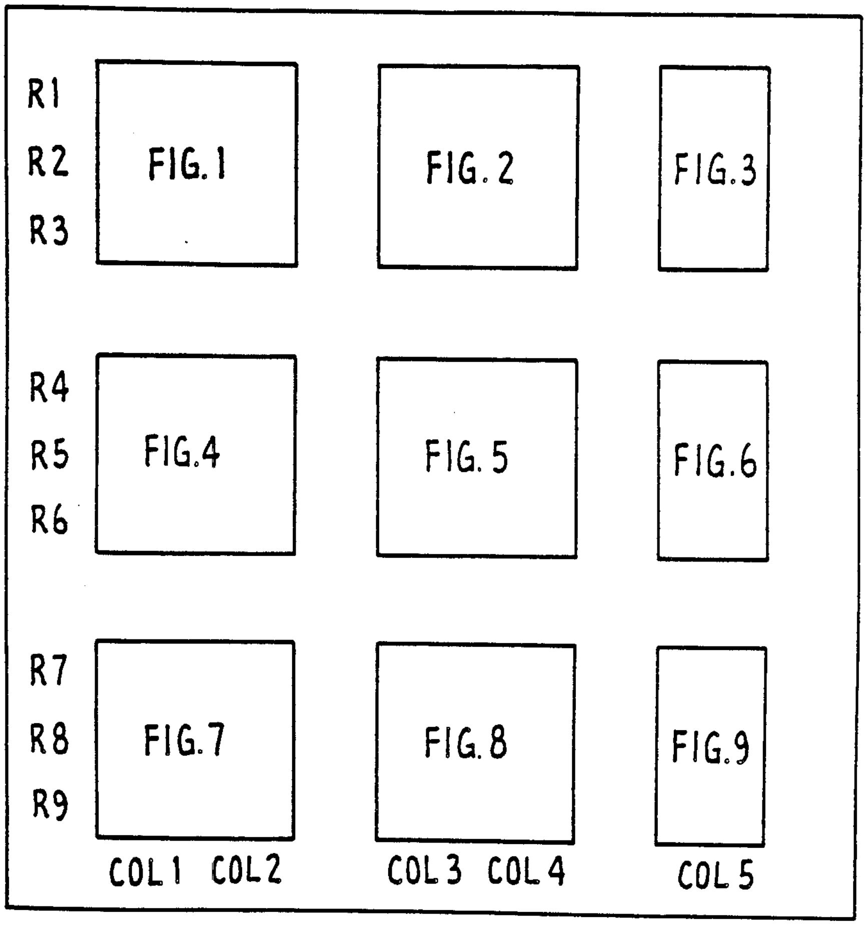
FIG. 10 is a diagram showing how FIGS. 1 through 9 fit together to form the periodic table of language elements.
Figure 11:
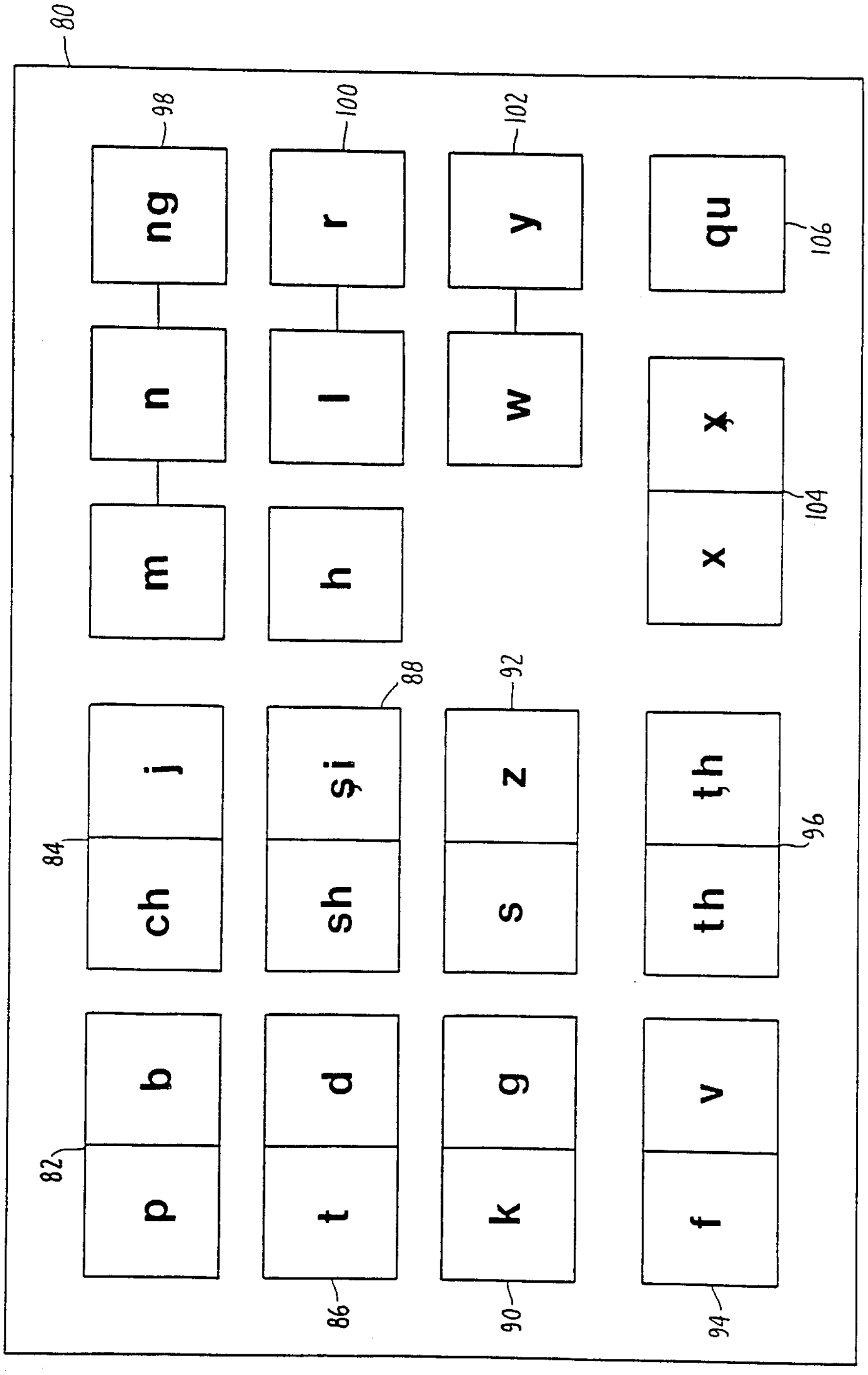
FIG. 11 shows the consonant phonomat with all language elements in place.

The consonant phonomat 80 is shown in FIG. 11. Twenty-seven consonant speech sounds are represented on the consonant phonomat 80. The boxes 82, 84, 86, 88, 90, 92, 94 and 96 linked together on the left side of the mat exhibit eight pairs of consonant sounds. Two different sounds within each pair will have identical articulation features, position of tongue, lips and glottis; however, one sound will be voiceless and the other voiced. Voiced sounds are speech sounds produced when the vocal folds (chords) nearly touch each other and cause the passage of air to vibrate. Voiceless sounds are speech sounds produced when the vocal folds (chords) separate and the passage of air does not vibrate. This concept is illustrated on the periodic table in FIGS. 2 and 5 with reference to language elements "b" and "p". The picture bet for "b" 200 in FIG. 2 and the picture bet for "p" 300 in FIG. 5 are nearly identical. However, just below the picture 200 in FIG. 2, there is a wavy line "〰" 202. This symbol represents a voiced sound. In FIG. 5, underneath the picture 300 is a straight line "302" to indicate that this sound bet is voiceless.

The PLOSIVE PAIRS are found in Boxes 82, 86, and 90 in FIG. 11. PLOSIVE PAIRS are consonant sounds produced when a burst of air is quickly released from the oral cavity after it has been momentarily blocked by the lips, or tongue-tip or back tongue. The COOL PAIRS are in boxes 94 and 96. COOL PAIRS are sounds produced when air passes over a moist articulator (tongue, lips or glottis). The articulator gets cooler because of evaporation from the articulator into the expelled air. The STREAM PAIRS are in boxes 84, 88 and 92. STREAM PAIRS are consonant sounds produced when air leaks through closed teeth and thin or pursed lips. The tongue articulation of these sounds will not be visible because of teeth blockage.

The boxes 98, 100, 102, 104 and 106 on the right side of the consonant phonomat 80 are linked together or stand alone for reasons other than pairing. Box 98 is linked together to represent the NASALS "m", "n" and ng" because air is expelled through the nose during articulation. The WIND sound "h" stands alone in Box 101. Four VOWEL-TONE CONSONANTS, "l", "r", "w" and "y" are placed in boxes 100 and 102 because they require a minimal amount of air blockage and require less articulation than do the other consonants. Boxes 104 and 106 are occupied by three CONSONANT DOUBLES. CONSONANT DOUBLES are combinations of two different speech sounds, for example "x" as /ks/; "χ" as /gz/ and "qu" as /kw/.

Figure 12:
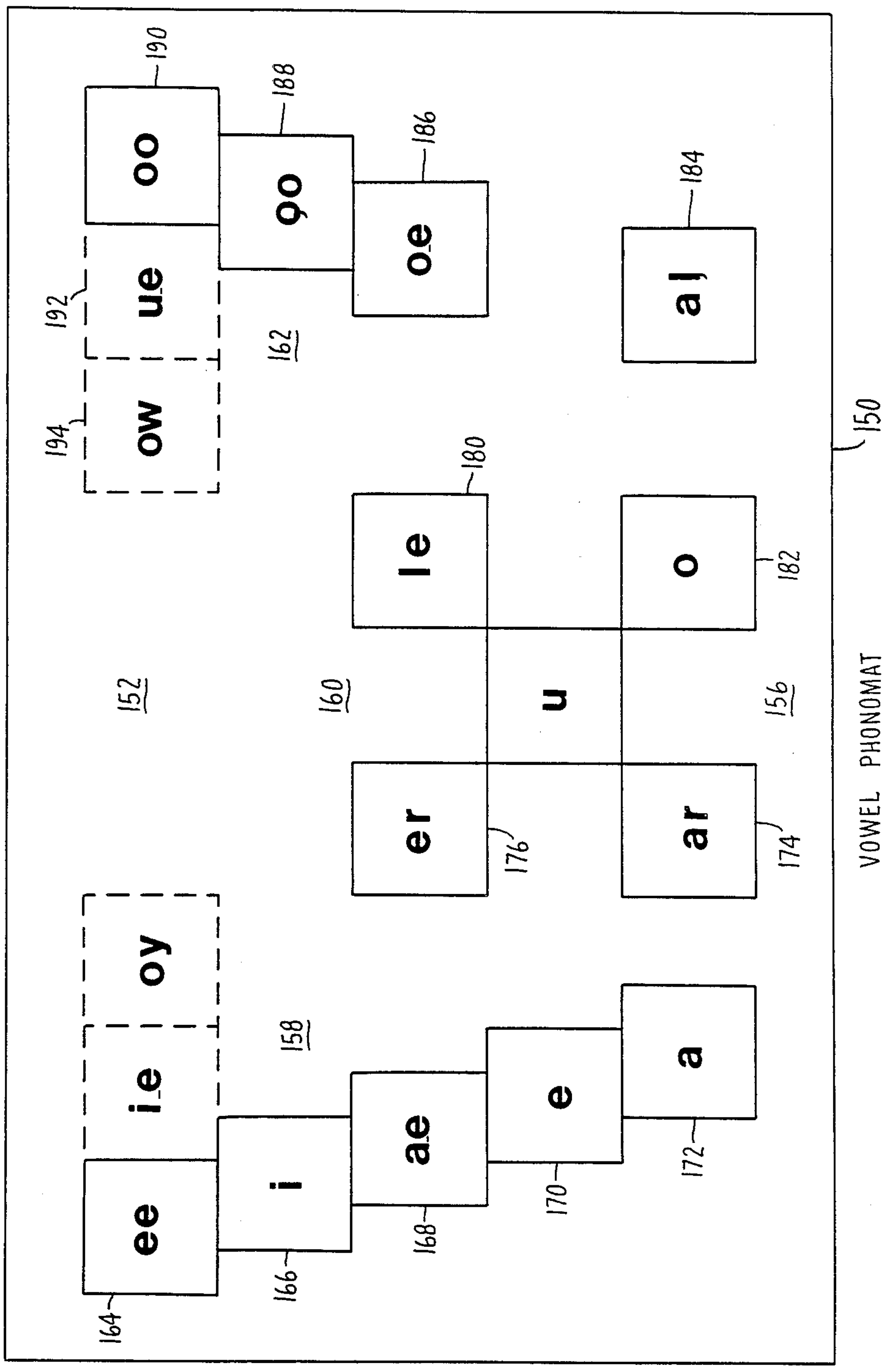
FIG. 12 shows the vowel phonomat with all language elements in place.

The vowel phonomat 150 is shown in FIG. 12. Eighteen vowel sounds will be represented on the vowel phonomat 150. The design arrangement of boxes diagrammatically shows the versatility of the tongue which is a very important muscle in the production of vowel sounds. The vowel phonomat 150 can be thought of as a tongue map. Each vowel has two coordinates on the map. One coordinate is approximately designated by front 158, central 160 or back 162; the other coordinate is designated approximately by high 152, mid 154 or low 156. To pinpoint the tongue position of a given sound it is possible to check the coordinates on the vowel phonomat 150 after the student has discovered them kinesthetically.

Another characteristic of vowel sounds is represented by the markings on the vowel phonomat 150. Solid-lined boxes 164, 166, 170, 172, 176, 178, 180, 182, 184, 188, 190 represent STABLE VOWELS or vowel sounds which are produced without changing the tongue position or lip pattern. Solid-lined boxes with arrows 168, 174 and 186 represent STRAIGHT-SLIDER VOWELS, or vowel sounds produced when the tongue changes to a higher position before the completion of the sound and the lip pattern closes somewhat. Reference to the language elements "a_e", "o_e" and "ar" on the periodic table of language elements in FIGS. 1 and 4 shows the same " ↑ " below the photographs 46, 42, and 64. The broken-line boxes 192, 194, 196 and 198 represent CROSS-SLIDER VOWELS, or vowel sounds which are produced when the tongue begins in either a high, mid or low position but always ends in a high position and two tongue position and two lip patterns are necessary to complete the sound.

FRONT SMILE (vowel sounds produced when the front part of the tongue moves to the forward part of the mouth while the lips form into a smile pattern) vowels "ee", "i", "a-e" and "e" occupy boxes 164, 166, 168 and 170, respectively, because the tongue is positioned in the front and the lips form a smile pattern. BACK ROUND (vowel sounds produced when the back tongue moves to the back part of the mouth while the lips form into a round pattern) vowels "o_e", "oo" and "oo" occupy boxes 186, 188 and 190, respectively, because the tongue is positioned in the back and the lips form a round pattern. LOW OPENS "a", "ar", "o" and "aI" occupy boxes 172, 174, 182 and 184, respectively, because the tongue is in its lowest position and the lips are wide open. CENTRAL ROCKER (vowel sounds which are produced with a bowed central tongue that resembles the rung of a rocker and the lips form a half-open pattern) vowels "er", "u" and "le" occupy boxes 176, 178 and 180. CROSS SLIDER vowels "u_e", "ow", "oy" and "i_e" occupy boxes 192, 194, 196 and 198. Vowel bets "u_e" and "ow" end in round lips and should be placed in boxes 192 and 194. Vowel bets "oy" and "i_e" end with smile lips and should be placed in boxes 196 and 198.

Figure 13:
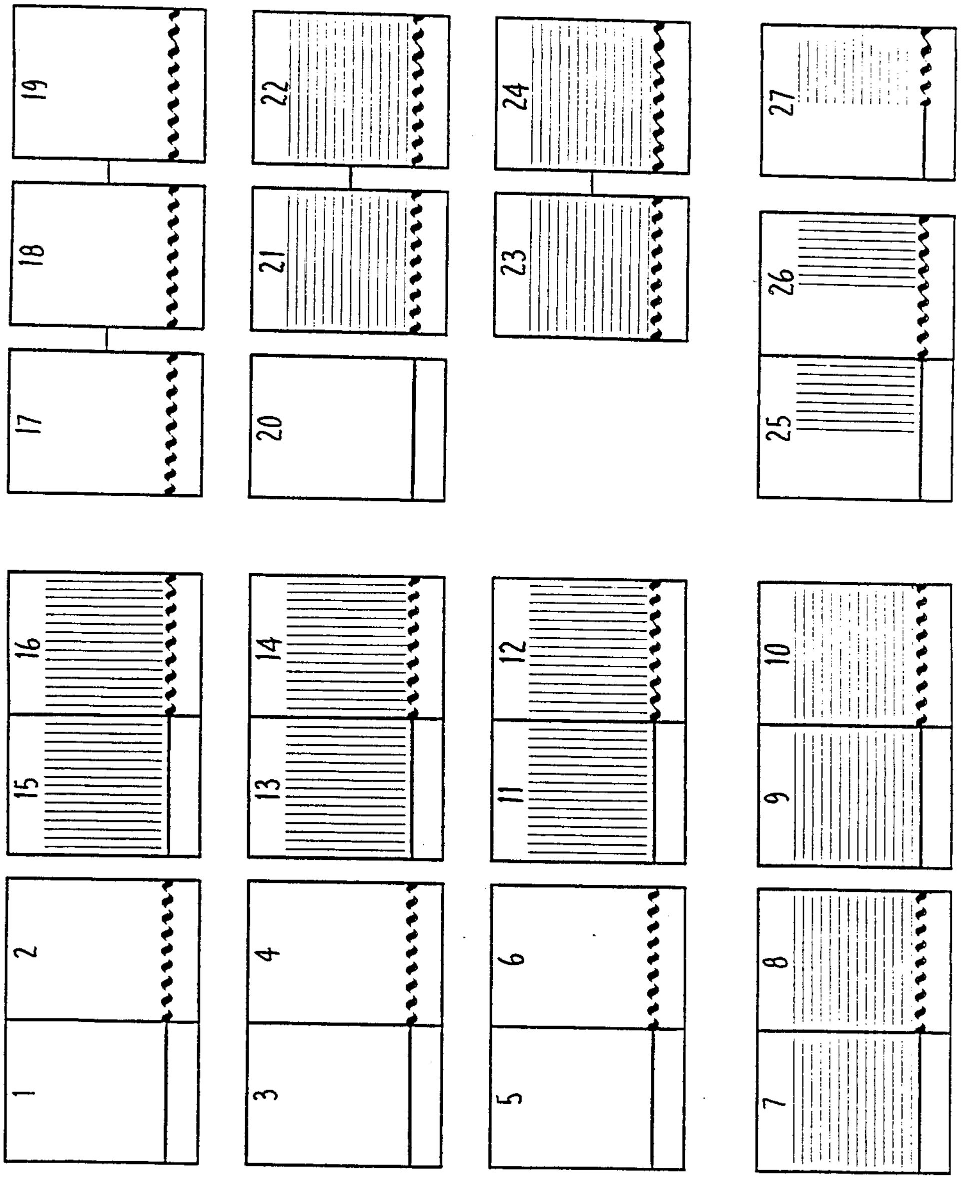
FIG. 13 shows the consonant phonomat without the language elements.
Figure 14:
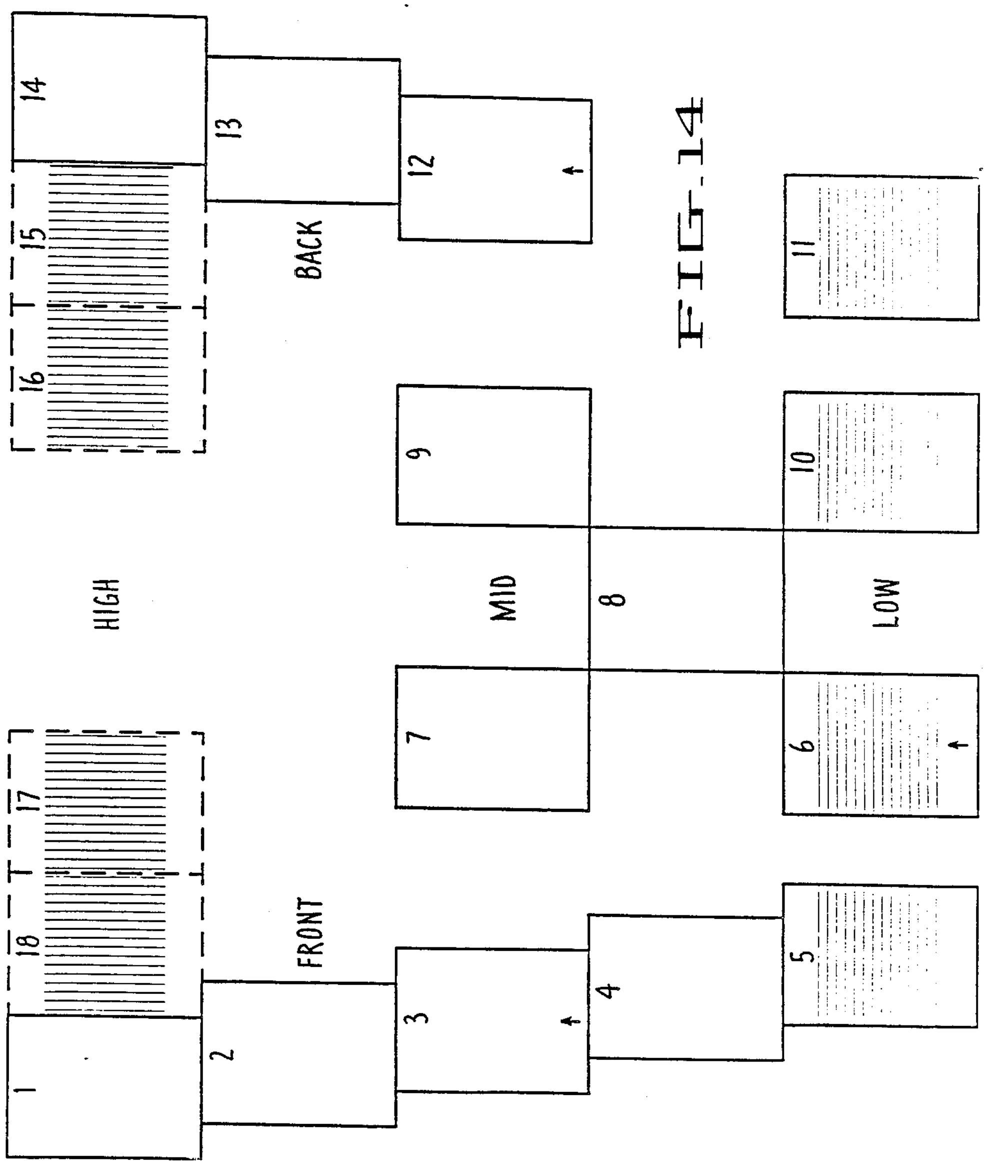
FIG. 14 shows the vowel phonomat without the language elements.

When used to enhance the learning experiences of the students, the phonomats are presented without the symbol bets as shown in FIGS. 13 and 14. The students are given stacks of cards containing all of the consonant bets and another stack containing all of the vowel bets. The student is then to place the symbol bets in their proper location according to the completed phonomats shown in FIGS. 11 and 12. The phonomat exercises are fundamental to the development of language skills and serve to reinforce the relationship amongst the groups of language elements.

The use of phonomats to engage the students in active learning can be accomplished by having the students play certain card games with the phonomats and stacks of cards:

1. Consonant Array

Materials: 27 C-Bets and 3 Wild Cards (Pictures or Symbols) 1 Consonant Phonomat Instructions:

(1) Two to five players sit around a table with the Consonant Phonomat and the player to the left of the last dealer is asked to shuffle the thirty cards and to lay out the cards face down in a rectangular array of five rows and six columns to one side of the phonomat.

(2) The player to the left of the dealer starts first. This player turns over two cards of his own choosing and allows them to be face up for *all* to see. Players are allowed only mental records of past plays.

(3) If these two cards are pairs, the player scores *one* point. If these cards are partners or the double pair /x̧/ or /x/, the player scores two points.

(4) If the player places them in the correct positions on the phonomat, the player scores *another* point. The dealer keeps the scores.

(5) After the play is made all other players in clockwise sequence say, "Yes" or "No", according to whether they approve or disapprove of the play. The dealer listens to the objections and awards the disputed points to the winner and corrects the play if necessary.

(6) If the player scores without correction, he gets a successive turn.

(7) If no pairs or partners are turned up, the two up cards are returned face down to their original position, and the next player turns up two cards of his choosing.

(8) The game continues until the phonomat is filled. A wild card is placed on the mat underneath its eligible partner which is either ng, h, or qu.

(9) The order of the winning is the same as the sequence of declining points. The one having the largest total is *first.* The next largest total points is *second.*

(10) A set of games is that number of games corresponding to the number of players. The winner of the set is the player with the highest total of game points in the set.

(11) For an alternate game which plays in less time, try turning up three or four cards each play to increase the chance of getting matching pairs or partners.

2. Consonant Draw

Materials: 27 C-bets and 3 wild cards (Pictures or Symbols) 1 Consonant Phonomat Instructions:

(1) Two players sit around a table with a Consonant Phonomat and a deck of 30 Consonant Cards.

(2) One player, called the dealer, shuffles the cards and deals five cards to each player, dealing alternately one at a time and face down. The rest of the cards are stacked between the two players.

(3) The non-dealer looks at his five cards and plays any pairs or partners for one point per two cards played. If cards are played before drawing, then the player draws that number of cards which will return his hand to five cards. If he can't play he draws one more to make six. If he still can't play, then he discards one card face up to the side of the stacked cards.

(4) The next player may pick up the top discard if the matching card is in the player's hand and if the play is made to the phonomat. Then the player draws two cards from the top of the down stack and plays again or discards one card while keeping five.

(5) If the top discard is not useable, the next player draws one from the top of the face down stack and plays two or discards one.

(6) The play continues in the same way until the down stack is depleted and then the discard stack is turned over and used to draw from as was the down stack.

(7) The play continues in the same way until all the cards in the stack are gone. Then the player whose turn it is to play draws one card from his opponents hand and plays or lets the next player draw one card from his hand and plays. The play continues is this manner until all places on the mat are filled.

(8) The winner is the player with the highest accumulation of points.

3. Vowel Array

Materials: 18 V-Bet Pictures and 18 V-Bet Symbols 1 Vowel Phonomat

Instructions:

(1) Two to five players sit around a table with the Vowel Phonomat and the player to the left of the last dealer is asked to shuffle the thirty-six vowel cards and to lay out the cards face down in a square array of six rows and six columns to one side of the vowel phonomat.

(2) The player fo the left of the dealer starts first. This player turns over two cards of his own choosing and allows them to be face up for *all* to see. Players are allowed only *mental* records of past plays.

(3) If the cards turned up represent the same vowel bet, then the player scores one point. Points are recored by the dealer.

(4) If the player places the vowel bet cards in their proper place on the vowel phonomat and makes the proper bet sound, the player scores *another* point.

(5) After the play is completed, all other players in a clockwise sequence get a chance to affirm or deny the play by saying "Yes" or "No" and their reason. The dealer listens to the objections and rebuttals and then awards the disputed points to the victor and corrects the play if necessary.

(6) If the player scores without correction, he gets a successive bonus turn.

(7) If no matching bets are turned up, then the up cards are returned face down, and the next player turns up *two* cards of his choosing.

(8) The game continues until the vowel phonomat is filled.

(9) The object of the game is to score the most points for *first* place.

(10) The number of players is the same as the number of games in one set. The winner of the set is the player with the highest total game points in the set.

(11) For an alternate game which plays in less time, try turning up three or four each play to increase the chance for matching bets.

C. Teaching Methods

The teaching objectives of this invention are the acquired skills of producing, identifying and classifying the language elements called bets which are designed on the periodic table of language elements. Students are made aware of articulation mechanisms, mouth patterns and tongue positions associated with each bet. Auditory, visual and kinesthetic feedback processing are used to correct language bet concepts through use of sound, picture and symbol bets. The method starts with a phonetic approach that moves into a transitional phase with picture bet associations and concludes with symbol bet associations.

1. Teaching Procedure and Step Charts

For each lesson of this invention students will be asked to follow the steps listed on a chart titled STUDY STEPS FOR CONSONANTS or STUDY STEPS FOR VOWELS. Teachers will need to make charts like those described below for consonants and for vowels. The charts should be displayed for all students to see. As students follow these steps they will learn how to organize their thinking and sensory information as they discover each new sound. Both the teacher and student participate in a dialogue which guides the student into forming associations for the three bets: sound, picture and symbol.

a. Study Steps for Consonants

Students will be asked in steps 1-6 to explore the speech production of a given sound bet. They will state in synopsis form specific articulation features of the sound. A nickname will be given to the sound. In steps 7-9 students will identify the picture and sound bets and place them in a specificed box on the phonomat. In step 10 the teacher supplies a keyword which contains the given sound. The students respond by saying the sound in context.

| STUDY STEPS FOR CONSONANTS | Sample Synopsis |
|---|---|
| 1. Say the new sound. | /p/ |
| 2. State its voicing. | voiceless |
| 3. Name the articulator(s) | lips |
| 4. Name the point of articulation contact. | closed lips |
| 5. Name the air exit. | oral (cavity) |
| 6. Nickname the sound bet. | Lip Stop, Lip Plosive |
| 7. Locate the picture bet.* | Bet #22 |
| 8. Locate the symbol bet.* | p |
| 9. Place bets on the phonomat. | Box 1 |
| 10. Learn the keyword. | pen |

*Students can verify their choice of picture and symbol on the periodic table of language elements, FIGS. 1-10.

b. Study Steps For Vowels

Students will be asked in steps 1-4 to identify the lip patterns and state the two tongue coordinates: front to back and high to low. To do this, students must watch the teacher's mouth, check their own mouths and determine with the teacher's help the correct tongue position. A nickname will be given to the sound bet. Steps 5-7 require the students to select a picture and symbol bet for the given sound. These bets will then be placed in the correct phonomat box. The teacher will supply a keyword which contains the given sound. In step 8 students respond by saying the sound in context.

| STUDY STEPS FOR VOWELS | Sample Synopsis |
|---|---|
| 1. Say the new sound. | /ee/ |
| 2. Discover the lip pattern. | smile |
| 3. Locate the tongue's position | |
| (A) Front to back | front |
| (B) High to Low | high |
| 4. Nickname the sound bet. | Front Smile |
| 5. Locate the picture bet. | Bet #5 |
| 6. Locate the symbol bet. | ee |
| 7. Place the bets on the phonomat | Box 1 |
| 8. Learn the keyword. | eel |

c. Simplified Chart Forms

Teachers may wish to use a simplified version of these charts for younger students.

| CONSONANTS | VOWELS |
|---|---|
| 1. Sound | 1. Sound |
| 2. Voicing | 2. Lip Pattern |
| 3. Articulator(s) | 3. Tongue Position |
| 4. Point of Contact | (A) front to back |
| 5. Air Exit | (B) high to low |
| 6. Nickname | 4. Nickname |
| 7. Picture Bet | 5. Picture Bet |
| 8. Symbol Bet | 6. Symbol Bet |
| 9. Phonomat Box | 7. Phonomat Box |
| 10. Keyword | 8. Keyword |

2. General Lesson Plan Guide a. Pre-lesson Preparation (1) Distribute appropriate laboratory materials relevant to the lesson.

(2) Students display the new picture and symbol bets under the phonomat in two separate rows.

(3) Teacher displays the periodic table of language elements and CONSONANT/VOWEL STUDY STEP charts for all to see.

| Lesson Sequencing | Teacher/Student Dialogue and Participation |
|---|---|
| (1) INTRODUCE THE NEW GROUP | T. briefly describes the important characteristics of the new group. |
| (2) INTRODUCE THE NEW SOUND BETS | T. articulates the first sound. |
| | S. observes T's mouthwork, repeats sound and observes his/her own mouthwork (use a mirror). For consonant sounds the S. identifies the articulator, point of articulation, air exit. For vowels S. identifies the lip pattern and tongue coordinates. |
| | T. helps S. determine the nickname for the sound bet. |
| (3) IDENTIFY NEW PICTURE BET | S. selects the new picture bet from among the other pictures within the group. |
| | T. & S. verify the selection on the periodic table of language elements. |
| (4) IDENTIFY NEW SYMBOL BET | S. selects the new symbol bet from among the other symbols within the group. |
| | T. & S. verify the selection on the periodic table of language elements. |
| (5) PLACE NEW BETS | T. designates the correct phonobet box. |

-continued

| Lesson Sequencing | Teacher/Student Dialogue and Participation |
|---|---|
| ON PHONOMAT | S. places both picture and symbol bets in the appropriate box. |
| (6) LEARN THE NEW KEYWORD | T. says the basic periodic table of language elements keyword. |
| | S. says new sound in the context of that word. |
| (7) REPEAT STEPS 1-6 | T. repeats all previous steps until each sound within the group has been identified and classified. |
| (8) REINFORCE & REVIEW | T. stabilizes the sensory information with a reinforcement activity. A review of previously learned sounds can be done at periodic intervals. |
| (9) COLLECT & STORE ALL LAB MATERIALS | |

3. Suggested Reinforcement Activities

Teachers may want to have an activity which establishes and reinforces sensory processing. Some of these activities are listed below and assumes that the students have the picture and symbol bets of a given group arranged in the phonomat boxes. The teacher will present one of these bets in the form of the sound, picture or symbol and then ask the student to give one or more of the other bet forms for the same bet. Each activity includes a series of three separate tasks to be performed by the students.

| Series No. | Teacher says or shows | Teacher asks students for |
|---|---|---|
| #1 | Sound Bet | Picture Bet |
| | Picture Bet | Symbol Bet |
| | Symbol Bet | Sound Bet |
| #2 | Sound Bet | Symbol Bet |
| | Picture Bet | Sound Bet |
| | Symbol Bet | Picture Bet |
| #3 | Sound Bet | Picture & Symbol Bets |
| | Picture Bet | Sound & Symbol Bets |
| | Symbol Bet | Sound & Picture Bets |
| #4 | Sound Bet | Picture, Symbol & Nickname |
| | Picture Bet | Sound, Symbol & Nickname |
| | Symbol Bet | Sound, Picture & Nickname |
| | Nickname | Sound, Picture & Nickname |
| #5 | Scramble all the Picture Bets! | Placement of all Picture Bets in 30 seconds. |
| | Scramble all the Symbol Bets | Placement of all Symbol Bets in 30 seconds. |
| | Scramble all Picture & Symbol Bets! | Placement of all Picture & Symbol bets in 1 minute or less. |
| #6 | Stack all bet cards into one pile. | Sound and nickname of each card in 30 seconds.* |

*Students can work in teams of two. One can be the timer while the other performs the task.

4. Bet Groups in Order of Teaching

To meet the needs of students, teachers need to decide the order for teaching the consonant and vowel groups. Two possible sequences are suggested: (1) teach all consonant groups before moving on to the vowel groups and (2) alternate by teaching one consonant group followed by one vowel group. Teach only one group in a lesson session so that no more than six and no less than three sounds are introduced at one time. The teacher should follow the patterning procedure listed on the consonant and vowel STEP CHARTS as each new sound is introduced.

A nickname is attached to each group for purposes of identification or when one wishes to refer to a certain sound in a game situation. A general nickname such as Plosives, Cools, Streams etc., may be used by faster or older students; a more specific consonant label such as Lip Stop, Lip Cool, Little Stream may be necessary for younger and slower students.

CONSONANT FAMILY GROUPINGS

| General Nickname | Group Sounds | Specific Nickname | Phonomat Box No. (FIG. 11) |
|---|---|---|---|
| PLOSIVE | /p/ /b/ | Lip Stop | 82 |
| | /t/ /d/ | Tongue-tip Stop | 86 |
| | /k/ /g/ | Back-tongue Stop | 90 |
| COOLS | /f/ /v/ | Lip Cools | 94 |
| | /th/ /th/ | Tongue Cools | 96 |
| STREAMS | /s/ /z/ | Little Streams | 92 |
| | /sh/ /si/ | Big Streams | 88 |
| | /ch/ /j/ | Pushed Streams | 84 |
| NASALS & WIND | /m/ /n/ /ng/ | Front, Mid, Back Nasals | 98 |
| | /h/ | Solo Wind | 101 |
| VOWEL-TONE | /l/ /r/ | Tongue Tonals | 100 |
| CONSONANTS | /w/ /y/ | Lip Tonals | 102 |
| CONSONANT DOUBLES | /x/ /x/ /qu/ | Consonant Doubles | 104, 106 |

VOWEL FAMILY GROUPINGS

| General Nickname | Group Sounds | Definitive Nickname | Phonomat Box No. (FIG. 12) |
|---|---|---|---|
| SMILES | /ee/ | Front Smile | 164 |
| | /i/ | Front Smile | 166 |
| | /ae/ | Front Slider | 168 |
| | /e/ | Front Smile | 170 |
| ROUNDS | /oe/ | Back Slider | 186 |
| | /oo/ | Back Round | 188 |
| | /oo/ | Back Round | 190 |
| OPENS | /a/ | Open Smile | 172 |
| | /ar/ | Central Slider | 174 |
| | /o/ | Central Open | 182 |
| | /al/ | Open Round | 184 |
| CENTRALS | /er/ | Central Rocker (back tongue) | 176 |
| | /u/ | Central Rocker (mid tongue) | 178 |
| | /le/ | Central Rocker (front tongue) | 180 |
| SLIDERS | /ue/ | Cross Slider | 192 |
| | /ow/ | Cross Slider | 194 |
| | /oy/ | Cross Slider | 196 |
| | /ie/ | Cross Slider | 198 |

Vowel Symbol Bets

Alphabet letters a, e, i, o, u, l, r, y, and w may be used by themselves or in combination to spell the symbols of the various vowel bets. Each alphabet letter has its alphabet name which is not the same as its speech sound component in a word. Examples of vowel digraphs are: al, oy, oi, oo, le, etc. The basic spelling appearing on the bet symbols are numbered at the bottom in periodic table of language element order.

Tagged Symbol Bets

When a letter of a symbol bet is tagged with a comma, dot or underline it is used as a reminder to remove the potential sound ambiguity. The BASIC and GO tagged symbol bets are listed below in periodic table of language element order.

| Tagged Symbol | Says | Example | Not to say | Example |
|---|---|---|---|---|
| y̧ | /ie/ as in | try̧ | /i/ as in | myth |
| y | /i/ as in | myth | /ie/ as in | try̧ |
| ģ | /g/ as in | gem | /g/ as in | gas |
| aļ | /al/ as in | call | /a/ as in | pal |
| n̡ | /ng/ as in | bank | /n/ as in | land |
| ϱw | /oe/ as in | snow | /ow/ as in | plow |
| şi | /si/ as in | vision | /sh/ as in | mission |
| ç | /s/ as in | cent | /k/ as in | cat |
| ϱo | /oo/ as in | book | /oo as in | moon |
| ţh | /th/ as in | this | /th/ as in | thin |
| x̧ | /gz/ as in | exist | /ks/ as in | box |
| ş | /z/ as in | rose | /s/ as in | base |

PERIODIC TABLE OF LANGUAGE ELEMENTS

Resource Concepts

Consonant Picture Bets

These bets portray a right-sided profile of the model. A wavy line under a picture bet denotes a voiced sound and a straight line under a bet denotes a voiceless sound. Two pictures with identical mouth patterns represent a consonant pair. The two sounds within each pair will have the same mouth aticulation. Eight pairs of picture bets forming pairs will be discovered: p, b; t, d; k, g etc. Picture bets exhibiting two mouth patterns represent the Consonant Doubles x, x̧ and qu. Each consonant picture bet exhibits the initial mouth pattern which is not necessarily the mouth pattern at the completion of the spoken sound. The pictures exhibiting more nose represent the nasal Sounds m, n, and ng.

Consonant Symbol Bets

Only two letters a̲ and o̲ from our common alphabet are not used to spell the various BASIC, GO and CAUTION consonant bet. The BASIC spellings appearing on the bet symbols are numbered at the bottom in periodic tables of language elements order. Each alphabet letter has its alphabet name which is not the same as its speech sound component in a word. One or more alphabet letters form bets which are associated with the speech sound in a word. A sound bet spelled with two letters is called a digraph. Examples of digraph consonant bets are: ch, ng, th, qu etc.

Vowel Picture Bets

These bets portray a front profile of the model. Students need to focus on the lip patterns when asked to identify the sound. These lip patterns are SMILE, OPEN and ROUND. When the tongue works in the front of the mouth for sounds /ee/, /i/, /ae/ and/e/ the lips will form a SMILE pattern. When the tongue is in its lowest position the lips form an OPEN pattern for /a/, /ar/, /o/ and /aļ/ bets. If the tongue is positioned in the back sounds /oe/, /ϱo/ and /oo/ appear to be a ROUND pattern. Sounds /er/, /u/ and /le/ form a half-open pattern because the tongue is in the central position. The tongue is not always visible in the picture bets so it is important for students to notice the lip patterns in order to determine the tongue position.

Pictures showing an arrow indicate the "straight slider" sounds. Three "straight slider" bets appear on the phonomat: one slides in the front tongue position, /ae/; one slides in the central tongue position, /ar/; one slides in the back tongue position, /oe/. The central "straight slider" is somewhat stronger than the others; therefore, two mouth patterns are shown on the central "straight slider" bet.

Four "cross slider" vowels /ue/, /ow/, /oy/, and /ie/ are produced when the tongue "cross slides" from one tongue position to another while at the same time the lip "cross slides" from one pattern to another. Two mouth patterns will be exhibited on the "Cross Slider" bets. The bottom picture denotes the start of the sound and the top picture denotes the completion of the sound.

In accordance with another aspect of this invention the language elements can be applied to a keyboard such as used in a typewriter or computer terminal. In one such embodiment the vowels could be "high" or in upper rows of keys and consonants could be "low" or in lower rows of keys. One arrangement is shown in Chart I below. Alternatively, the vowels could be in center columns of the keyboard to be operated with operator's index fingers.

CHART I - PHONETIC KEYBOARD

| a_e | ee | i_e | le | o_e | ar | oo | u_e | oy |
|---|---|---|---|---|---|---|---|---|
| a | e | i | aļ | o | er | oo | u | ow |
| b | f | j | m | p | sh | th | v | x |
| ch | g | k | ng | qu | şi | ţh | w | y |
| d | h | l | n | r | s | t | x | z |

Obviously, other modifications and variations of the present invention are possible in light of the above teachings. It is therefore to be understood that changes may be made in the particular embodiments described herein which are within the scope of the appended claims.

We claim:

1. An apparatus for teaching and enunciation of a major family of language elements known as consonants which apparatus comprises:

a substrate upon which a plurality of language elements are arranged in a rectangular array having twenty-seven positions, said array characterized by a left hand side having eight consonant language element pairs wherein the individual language elements of said left hand side consonant pairs are identically articulated but differently voiced, and said array is further characterized by a right hand side having four distinct groups of consonant language elements, said right hand groups known as "nasals," "vowel-tone," "wind" and "consonant doubles," said right hand groups differentiated by kinesthetic requirements.

2. An apparatus as in claim 1 wherein the language elements are arranged on said substrate in substantially the following format:

| | | | | | | |
|---|---|---|---|---|---|---|
| p | b | ch | j | m | n | ng |
| t | d | sh | şi | h | l | r |
| k | g | s | z | | w | y |
| f | v | th | th | x | x̧ | qu. |

3. An apparatus as in claim 1 wherein each language element position on said substrate further comprises a frequency indicator symbol, said symbol related to the voicing requirements of the language element corresponding to said array position.

4. An apparatus for teaching and enunciation of a major family of language elements known as vowels which apparatus comprises:

a substrate upon which a plurality of vowel language elements are arranged in a substantially W-shaped array having eighteen positions, said array characterized by three types of vowel langauge element positions, stable vowel positions marked with solid-lined boxes, straight-slider vowel positions marked with solid lined boxes containing an arrow, and cross-slider vowels marked with broken lined boxes, wherein the individual vowel language element positions of said array are arranged to correspond to a tongue position during articulation of that vowel language element, the tongue position defined in terms of spatial coordinates using two axis, the first having front, central and back coordinates, the second axis having high, mid and low coordinates.

5. An apparatus as in claim 4 wherein the language elements are arranged on said substrate in substantially the following format:

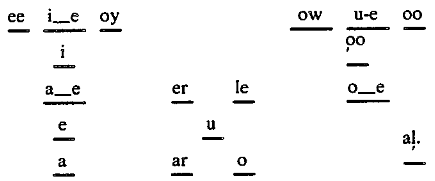

6. A system for teaching and transcription of language which comprises:

a first substrate upon which a plurality of language elements are arranged in a rectangular array having twenty-seven positions, said array characterized by a left hand side having eight consonant language element pairs wherein the individual language elements of said left hand side consonant pairs are identically articulated but differently voiced, and said array is further characterized by a right hand side having four distinct groups of consonant langauge elements, said right hand groups known as "nasals," "vowel-tone," "wind" and "consonant doubles," said right hand groups differentiated by kinesthetic requirements; and a second substrate upon which a plurality of vowel language elements are arranged in a substantially W-shaped array having eighteen positions, said array characterized by three types of vowel language element positions, stable vowel positions marked with solid-lined boxes, straight-slider vowel positions marked with solid lined boxes containing an arrow, and cross-slider vowels marked with broken lined boxes, wherein the individual vowel language element positions of said array are arranged to correspond to a tongue position during articulation of that vowel language element, the tongue position defined in terms of spatial coordinates using two axis, the first axis having front, central and back coordinates, the second axis having high, mid and low coordinates.

7. A method of teaching and enunciation of language elements using the system of claim 6 which comprises the steps of:

(a) providing the system of claim 6;

(b) presenting sounds associated with each of the langauge elements of the system of claim 6;

(c) introducing the articulation mechanism, mouth pattern and tongue position associated with the sounds of each language element;

(d) introducing a symbolic representation for each language element; and (e) relating said language element articulation mechanism to the symbol position of the language element in the system of claim 6.

* * * * *